United States Patent
Brule et al.

(10) Patent No.: US 7,011,873 B2
(45) Date of Patent: *Mar. 14, 2006

(54) USE OF POLY(DIMETHYL KETONE) TO MANUFACTURE ARTICLES IN DIRECT CONTACT WITH A HUMID OR AQUEOUS MEDIUM

(75) Inventors: Benoit Brule, Bernay (FR); Reinhard Linemann, Bernay (FR)

(73) Assignee: Arkema, Puteaux (FR)

( * ) Notice: Subject to any disclaimer, the term of this patent is extended or adjusted under 35 U.S.C. 154(b) by 215 days.

This patent is subject to a terminal disclaimer.

(21) Appl. No.: 10/631,074

(22) Filed: Jul. 31, 2003

(65) Prior Publication Data

US 2004/0121099 A1   Jun. 24, 2004

(30) Foreign Application Priority Data

Aug. 2, 2002   (FR) .................................. 02 09860

(51) Int. Cl.
*B29D 22/00* (2006.01)
*B29D 23/00* (2006.01)
*B32B 1/08* (2006.01)

(52) U.S. Cl. .................... 428/36.6; 428/36.7; 428/480; 428/483; 428/524; 526/316; 422/40

(58) Field of Classification Search ............... 428/36.6, 428/36.7, 480, 483, 524; 526/316; 422/40
See application file for complete search history.

(56) References Cited

U.S. PATENT DOCUMENTS 3,350,357 A      10/1967  Natta et al.
6,528,135 B1 *   3/2003   Egret et al. ................ 428/36.6

FOREIGN PATENT DOCUMENTS

EP       1002819 A1 *  5/2000

OTHER PUBLICATIONS

Sugimoto H. et al., "Lanthanoid Alkoxide and Novel Initiator for the Synthesis of Polyester via Polymerization of Ketenes", Macromolecular Chemistry and Physics, Wiley Vch Weinheim, De, vol. 199, No. 8, Aug. 1, 1998, pp. 1651-1655, XP000785420,ISSN; 1022-1352.

* cited by examiner

*Primary Examiner*—Michael C. Miggins
(74) *Attorney, Agent, or Firm*—Thomas F. Roland

(57) ABSTRACT

The invention relates to the use of a structure for manufacturing hermetical industrial or food packaging in direct contact with a humid or aqueous medium, the structure comprising at least one layer of polydimethyl ketone in direct contact with the most humid medium, (i) the latter being situated within the packaging when the packaging accommodates water or an aqueous or humid product and (ii) the most humid medium being situated outside the packaging when the packaging accommodates a product which is dry or which is to be protected from humidity. The food packaging comprises, for example, trays, sachets, bottles and flasks and the industrial packaging comprises, for example, pipes, containers and drums.

15 Claims, No Drawings

USE OF POLY(DIMETHYL KETONE) TO MANUFACTURE ARTICLES IN DIRECT CONTACT WITH A HUMID OR AQUEOUS MEDIUM

This Application claims priority of U.S. Provisional Application No. FR 02.09860 filed Aug. 2, 2002.

FIELD OF THE INVENTION

The present invention relates to the use of a polymer (A) obtained from the polymerization of dimethylketene to manufacture articles which are in direct contact with water or are used in a humid atmosphere with a relative humidity of more than 50%, and to the articles themselves.

BACKGROUND OF THE INVENTION

Dimethylketene (DMK) has the formula:

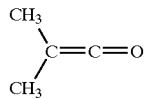

The existence of a carbon-oxygen and a carbon-carbon double bond allows one or the other of these double bonds to be opened selectively depending on the polymerization conditions. The polymerization of this monomer may therefore give rise to two different structural units:

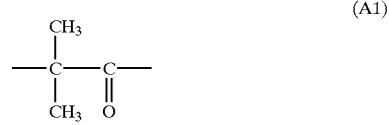

Regular head-to-tail linking of the units (A1) leads to polymers with a β-ketone structure and head-to-tail linking of the units (A2) leads to polymers with a polyvinylacetal-type structure. Alternating addition of the two units (A1) and (A2) leads to a polyvinyl ester structure:

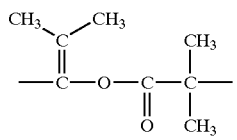

The polymer (A) used in the invention is such that the A2/(A1+A2) molar ratio is between 0 and 30%, meaning that the polymer (A) contains from 70 to 100 mol % of units (A1) and from 30 to 0 mol % of units (A2). It is then referred to as polydimethyl ketone, since the ketone units are predominant in the polymer.

In the packaging industry in general, and the food packaging industry in particular, it is very useful to have material which is insensitive to humidity, which is impermeable to water and which does not swell by absorbing water in a humid or aqueous medium. The reason for this is that the food packaging may accommodate beverages or foods containing a large proportion of water and may also undergo pasteurization- or sterilization-type treatments in the course of the packing process. Moreover, the impermeability of the packaging to water or to water vapour may be used to protect water-sensitive contents from a humid external atmosphere. This is particularly useful for the packaging of biscuitmaking, pastrymaking and bakery products which are sensitive to humidity, in the context of food packaging, and of anhydrous chemical products, in the context of industrial packaging.

Packaging to date has been produced using a multilayer polyolefin/tie/ethylene vinyl alcohol copolymer (EVOH)/tie/polyolefin structure. Within this structure the role of the EVOH is as a barrier to gases, in particular to oxygen, and the polyolefin layers (generally polyethylene or polypropylene) protect the EVOH from water, since EVOH losses its barrier properties in the presence of water or humidity. This structure presents the disadvantage of comprising a plurality of layers in order to be effective. It has now been found that it is possible to produce packaging using a monolayer structure of polydimethyl ketone type which has all of the properties required for use in an aqueous or humid medium: water-impermeable or a water barrier, insensitive to water (the physical and mechanical properties remain constant in the presence of water), a non-absorber of water and a barrier to oxygen whatever the humidity level of the medium.

U.S. Pat. No. 6,528,135, incorporated herein by reference, describes the gas, hydrocarbon and motor fuel barrier properties of polydimethyl ketone films. It also demonstrates that the oxygen barrier property of polydimethyl ketone is fairly insensitive to relative humidity, in contrast to that of EVOH. However, although this polymer is used for its stability in a hydrophobic medium such as hydrocarbons and motor fuels, there was nothing to suggest its qualities in the presence of humid or aqueous media.

The polydimethyl ketone of the invention is useful for a good number of applications which involve direct contact with a humid or aqueous medium. It is especially useful for manufacturing packaging which comprises at least one layer of polydimethyl ketone and which is intended for containing water or hydrophilic liquids such as for example beer, soda, fruit juice, milk and milk products, or foods which contain water by definition.

SUMMARY OF THE INVENTION

The invention provides for the use of a structure for manufacturing hermetical industrial or food packaging in direct contact with a humid or aqueous medium, the said structure comprising at least one layer of a polymer (A) in direct contact with the most humid medium, the latter being situated within the packaging when the packaging accommodates water or an aqueous or humid product and the most humid medium being situated outside the packaging when the packaging accommodates a product which is dry or which is to be protected from humidity, the polymer (A) comprising the following units:

-continued

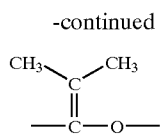
(A2)

and the A2/(A1+A2) molar ratio being between 0 and 30%.

The invention likewise relates to an article in direct contact with a humid or aqueous medium, comprising a structure comprising at least one layer of a polymer (A) in direct contact with the most humid medium, the latter being situated within the packaging when the packaging accommodates water or an aqueous or humid product and the most humid medium being situated outside the packaging when the packaging accommodates a product which is dry or which is to be protected from humidity, the polymer (A) comprising the following units:

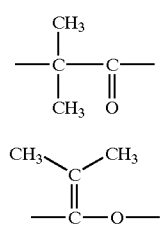

(A1)

(A2)

and the A2/(A1+A2) molar ratio being between 0 and 30%.

In accordance with one embodiment the A2/(A1+A2) molar ratio is preferably between 5 and 15%.

In accordance with one embodiment the article comprises a multilayer structure comprising in addition to the layer of polymer (A) at least one layer of a polymer (B), it being possible for there to be a tie between the layers of polymers (A) and (B).

In accordance with one embodiment the article is characterized in that it is a food packaging form such as a tray, a sachet, a bottle or a flask or an industrial packaging form such as a pipe, a container or a drum.

The invention will now be described in greater detail.

DETAILED DESCRIPTION OF THE INVENTION

The invention relates to the use of a structure to manufacture packaging. In a preferred embodiment, the structure is used as a monolayer structure—that is, it has a single layer of polymer and that polymer is (A).

In another embodiment, the structure may be multilayer, comprising at least one layer of the polymer (A) and at least one layer of polymer (B). A tie layer may be present between the layers of polymers (A) and (B). Statements made regarding the monolayer structure are equally applicable to the multilayer structure. It is possible for the layer (B) to be situated on either one side or the other side of the layer of polymer (A) even if, as preferred, the most humid or aqueous medium is in direct contact with the layer of polymer (A) in the packaging.

In the case of a multiplayer structure, there exist two possible embodiments:
a) an aqueous or humid product is packaged and thus water exchange from the inside to the outside of the packaging is prevented; or
b) a dry or humidity-sensitive product is packaged and thus water exchange from the outside to the inside of the packaging is avoided.

The present invention likewise relates to articles manufactured with any one of the above monolayer or multilayer structures, especially articles in direct contact with a humid (Relative Humidity, RH>50%) or aqueous medium. These articles may be, generally, packaging accommodating an aqueous medium or a medium which is to be protected from humidity, and more particularly food packaging or industrial packaging.

Food packaging comprises, for example, bottles, trays, flasks, bags and sachets which are made with the monolayer or multilayer structures in the form of monolayer or multilayer films.

Industrial packaging comprises for example containers or drums for the chemical industry for preventing exchange of water molecules on either side of the walls of the container or, for example, heating pipes which are incorporated into the floors or walls of dwellings. In these pipes the polymer (A) forms the inner layer in direct contact with the heating water, in the case of a multilayer-structure pipe, or the pipe comprises only a single layer which is made of polymer (A) and is in direct contact with the heating water and with the medium outside the pipe.

The polymer (A) will now be described here in detail.

Dimethylketene is obtainable by pyrolysis of isobutyric anhydride. This synthesis has been described in patents GB 965762, FR 1381831 and U.S. Pat. No. 3,201,474. It has also been described in the following articles:

M. Mugno, M. Bornengo, *Chim. Ind.* (Milan) 46, 1, 5–9, 1964

G. F. Pregaglia, M. Binaghi, *Makromol. Syn.*, 3, 150–160, 1968.

This pyrolysis can be carried out between 550° C. and 675° C. under an absolute pressure of between 30 and 40 mmHg (3960 and 5280 Pa).

The polymerization of the dimethylketene to give the polymer (A) can be carried out in the presence of a catalyst of formula $Al(R1)_{3-m}X_m$ in which X is a halogen atom R1 denotes an alkyl, aryl, cycloalkyl or alkoxy group or a hydrogen atom.

Examples of catalysts useful in the invention include, but are not limited to, $AlCl_2C_2H_5$; $AlCl(C_2H_5)_2$; $AlC_6H_5Cl_2$; $Al(OC_3H_7)Br_2$; $AlBr_3$; $AlCl_3$; or their dimers of the sesquihalides of the $AlC_2H_5Cl_2.Al(C_2H_5)_2Cl$ type.

It is also possible to use another catalyst such as an organometallic compound of a metal from group two of the table of elements or the complexes of these compounds with the ethers. Useful catalysts include, for example, dialkylberylliums, alkylberyllium monohalides, dialkylmagnesiums, alkylmagnesium monohalides, dialkylzincs and alkylzinc monohalides. The polymerization may be carried out between −100° C. and +40° C., optionally in the presence of a solvent subject to the proviso that the solvent does not react with the monomer and does not decompose the catalyst. Examples of useful solvents include aliphatic, cyclic and aromatic hydrocarbons and solvents having a high dielectric constant such as nitrobenzene, dichloromethane, 1,1,1,2-tetrachloroethane and 1,1-dichloroethylene. This polymerization is also described in GB 987370 and GB 893908. It is also described in the following articles:

G. F. Pregaglia, M. Peraldo, M. Binaghi, *Gazz. Chim. Ital.*, 92, 488–500, 1962.

G. F. Pregaglia, M. Binaghi, *Makromol. Syn.,* 3, 150–165, 1968.

G. Natta, G. Mazzanti, G. F. Pregaglia, M. Binaghi, M. Peraldo, *J. Am. Chem. Soc.,* Vol. 82, 4742–4743, 1960.

The proportion of A2 in the polymer (A) depends on the polymerization conditions, particular the polarity of the solvent. This proportion is important for the technical qualities of the polymer (A), particularly with regard to water.

The proportion of A2 is generally between 0 and 30 mol %, and preferably from 5 to 15 mol %.

The polymer (A) is thermoplastic and has the following properties:

thermal degradation: beginning of degradation from 300° C. without stabilizer, obtained by thermogravimetry at 10° C./min.

density: 1.28 melting temperatures at 230° C. and 255° C.; peak measured by differential thermal analysis (20° C./min under nitrogen)

intrinsic viscosity in solution at 20° C.: 0.5 to 3 (for a 0.5 g/dl solution in meta-cresol).

The polymer (A) can be converted into a film by the customary means for thermoplastics, such as film blowing, pressing, calendering or slot die extrusion. Hollow articles of polymer (A) can be produced by extrusion (for tubes) or extrusion blow moulding (for hollow bodies).

For multilayer structures, the polymer (B) can be selected for example from polyolefins, polystyrenes, polyamides, polycarbonate, PVC, PVDF and saturated polyesters such as PET and PBT.

Examples include the following (A)/(B) structures:

(A)/(PA-6); (A)/(PA-6.6); (A)/(PA-6/6.6); (A)/(PA-11); (A)/(PA-12); (A)/(PE);
(A)/(polypropylene).

For flexible films for making sachets, these structures have respective thicknesses, for example of 5 to 30 $\mu$m/15 to 100 $\mu$m.

For coextruded tubes the thicknesses may be 5 to 10 000 $\mu$m/0.5 to 5 mm.

For hollow bodies the thicknesses depend on the volume and may be several millimetres. It is recommended to provide a tie between the layers (A) and (B).

Examples of ties include the following:

a) polyethylene, polypropylene, copolymers of ethylene and at least one alpha-olefin, mixtures of these polymers, all of these polymers being grafted with unsaturated carboxylic acid anhydrides such as, for example, maleic anhydride. It is also possible to use mixtures of these grafted polymers and of these ungrafted polymers.

b) copolymers of ethylene with at least one compound selected from (i) unsaturated carboxylic acids and their salts and esters, (ii) vinyl esters of saturated carboxylic acids, (iii) unsaturated dicarboxylic acids and their salts, esters, monoesters and anhydrides, (iv) unsaturated epoxides; it being possible for these polymers to be grafted with unsaturated dicarboxylic acid anhydrides such as maleic anhydride or with unsaturated epoxides such as glycidyl methacrylate. It is also possible to add to one or to each of the layers a product which enhances its adhesion without the need to use a tie layer. This product may be the tie described above.

EXAMPLES

The properties of the polymer (A) will now be illustrated with reference to inventive and comparative examples. In order to show the water impermeability properties of the film, monolayer films 50 $\mu$m thick are first manufactured with polymers other than the polymer (A) (comparative examples comp. 1 to comp. 11) and with the polymer (A) (Ex. 1: 5–10 mol % of units (A2)) and then their water permeability is measured at 38° C. in g per m$^2$ per 24 hours for a film thickness of 50 $\mu$m in accordance with the standard ASTM E96E. The results are collated in Table 1.

TABLE 1

| Material | | Water permeability in g · 50 $\mu$m/(m$^2$ · 24 h) |
|---|---|---|
| Comp. 1 | PVDC | 1.5 |
| Comp. 2 | HDPE | 3 |
| Comp. 3 | PP | 5 |
| Comp. 4 | LDPE | 5 |
| Ex. 1 | Polymer (A) | 6 |
| Comp. 5 | PET | 16 |
| Comp. 6 | PVC | 18 |
| Comp. 7 | EVOH (38 mol % of ethylene) | 20 |
| Comp. 8 | PA-MXD.6 (aromatic PA) | 35 |
| Comp. 9 | EVOH (32 mol % of ethylene) | 35 |
| Comp. 10 | PAN | 50 |
| Comp. 11 | PA 6 | 85 |

Polymer (A), i.e. the polydimethyl ketone, is 3 to 6 times more impermeable than EVOH and is at the level of the polyolefins (PE and PP) which are customarily used to protect EVOH in packaging.

The water absorption is measured with two films of the same thickness, one made of polymer (A), the other of EVOH (38 mol % of ethylene), which are immersed in water at 30° C. The percentage of water at this temperature is measured in both cases. There is 0.1% by weight of water in the film of polymer (A) and 11.2% in that of EVOH. Polymer (A), i.e. the polydimethyl ketone, therefore absorbs 100 times less water than EVOH.

These properties are highly advantageous from an industrial standpoint and in particular from a performance standpoint and have never hitherto been demonstrated.

What is claimed is:

1. A method of preventing water or hydrophilic liquid exchange in hermetical industrial or food packaging for use in direct contact with a humid or aqueous medium, comprising placing a barrier film in a locus where water or a hydrophilic liquid is present, wherein said barrier film comprises at least one layer of a polydimethyl ketone polymer (A) comprising repeating units of:

$$-\underset{\underset{CH_3}{|}}{\overset{\overset{CH_3}{|}}{C}}-\overset{\overset{O}{\|}}{C}- \quad (A1)$$

$$-\underset{\underset{\|}{C}}{\overset{CH_3\diagdown \diagup CH_3}{C}}-O- \quad (A2)$$

wherein the A2/(A1+A2) molar ratio is between 0 and 30 percent.

2. The method of claim 1 wherein said polydimethyl ketone layer is situated on the inside of said packaging when said packaging contains water, and aqueous product, or a humid product.

3. The method of claim 1 wherein said polydimethyl ketone layer is situated on the outside of said packaging when the packaging contains a product to be protected from humidity.

4. The method of claim 1 wherein said A2/(A1+A2) molar ratio is between 5 and 15 percent.

5. An article comprising a structure having at least one layer of a polydimethyl ketone polymer (A) comprising repeating units of:

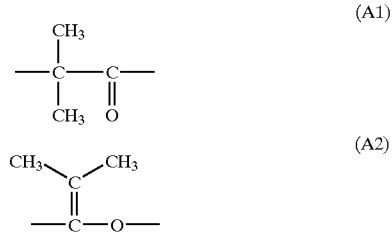

wherein the A2/(A1+A2) molar ratio is between 0 and 30 percent, and
wherein said structure is in direct contact with water or a hydrophilic liquid.

6. The article of claim 5 wherein said A2/(A1+A2) molar ratio is between 5 and 15 percent.

7. The article of claim 5 comprising a multilayer structure comprising said polydimethyl ketone polymer (A) layer and one or more layers (B) of at least one other polymer.

8. The article of claim 7 wherein said multilayer structure further comprises a tie between the layers of the polydimethyl ketone polymer (A) and polymer layer (B).

9. The article of claim 5 wherein said polydimethyl ketone polymer (A) layer has a thickness of from 5 to 10,000 $\mu$m.

10. The article of claim 5 wherein said polydimethyl ketone polymer (A) layer has a thickness of from 5 to 30 $\mu$m.

11. The article of claim 7 wherein said polymer layer (B) has a thickness of from 15 $\mu$m to 5 mm.

12. The article of claim 5 comprising a food or industrial packaging article selected from the group consisting of a tray, a sachet, a bottle, a flask, a pipe, a container, and a drum.

13. The article of claim 5 wherein said article comprises hermetical industrial or food packaging.

14. The article of claim 13 wherein said polydimethyl ketone polymer (A) layer is situated on the inside of said packaging when said packaging contains water, and aqueous product, or a humid product.

15. The article of claim 13 wherein said polydimethyl ketone polymer (A) layer is situated on the outside of said packaging when the packaging contains a product to be protected from humidity.

* * * * *